(12) United States Patent
Shahinpoor et al.

(10) Patent No.: US 7,850,951 B2
(45) Date of Patent: Dec. 14, 2010

(54) SYNTHETIC MUSCLE-BASED MULTI-POWERED ACTIVE CONTACT LENS

(76) Inventors: Mohsen Shahinpoor, 9910 Tanoan Dr. NE., Albuquerque, NM (US) 87111; David Soltanpour, 200 E. 90th., St., Suite 6A, New York, NY (US) 10128

(*) Notice: Subject to any disclaimer, the term of this patent is extended or adjusted under 35 U.S.C. 154(b) by 1333 days.

(21) Appl. No.: 11/358,530

(22) Filed: Feb. 21, 2006

(65) Prior Publication Data

US 2007/0196430 A1    Aug. 23, 2007

(51) Int. Cl.
*A61K 8/721* (2006.01)

(52) U.S. Cl. .................................................. 424/70.11

(58) Field of Classification Search ............... 424/70.11
See application file for complete search history.

(56) References Cited

U.S. PATENT DOCUMENTS 3,908,680 A * 9/1975 Krezanoski ................. 134/27
4,095,877 A * 6/1978 Stoy et al. ............... 351/160 R

* cited by examiner

*Primary Examiner*—Michael G Hartley
*Assistant Examiner*—James W Rogers
(74) *Attorney, Agent, or Firm*—V. Gerald Grafe

(57) ABSTRACT

A novel active contact lens system configured to allow the wearer to alter the corrective features of the contact lens by means of a biasing force. The biasing force can, for example, be different eye drop solutions having different pH levels.

12 Claims, 3 Drawing Sheets

US 7,850,951 B2

SYNTHETIC MUSCLE-BASED MULTI-POWERED ACTIVE CONTACT LENS

TECHNICAL FIELD

The present invention is generally related to restoration of vision through the use of a chemically activated contact lens.

BACKGROUND OF THE INVENTION

The use of contact lenses for correcting focal length-related vision impairments such as myopia, hyperopia, and presbyopia is well known. Non-surgical techniques for correcting myopia (short-sightedness) and hyperopia (far-sightedness) typically include glasses or contact lenses. Presbyopia is most commonly corrected with reading glasses. However, a given individual can have two of the above vision impairments, for example, both myopia and presbyopia. In such a case, the individual is often forced to switch between multiple pairs of glasses, wear bifocals, or wear contact lenses to correct for the myopia and reading glasses to correct for the presbyopia. Alternatively, the individual can be given a contact lens for one eye that corrects the myopia and a contact lens for the other eye that corrects the presbyopia.

Active contact lens systems that adjust in the eye to correct different vision requirements are an emerging area of ophthalmology. Blum et al in U.S. Pat. No. 6,851,805 entitled "Stabilized electro-active contact lens," issued Feb. 8, 2005 teaches an electro-active contact lens system and a method for making the electro-active contact lens system. The system includes a contact lens, an electro-active element attached to the contact lens, a view detector attached to the contact lens and in electronic communication with the electro-active element, and a power source attached to the contact lens. In certain embodiments, the view detector can be a rangefinder which determines the distance of an object being viewed. These embodiments further include a means to stabilize the rangefinder between the opening of the eyelids when the electro-active contact lens system is worn by a wearer. The electro-active contact lens system provides electro-active vision correction of one or more focal lengths.

SUMMARY OF THE INVENTION

The present invention provides a novel active contact lens system configured to allow the wearer to alter the corrective features of the contact lens by means of a biasing force. The biasing force can, for example, be different eye drop solutions having different pH levels.

Additional objects, advantages and other novel features of the invention will be set forth in part in the description that follows and in part will become apparent to those skilled in the art upon examination of the following or may be learned with the practice of the invention. Other objects of the present invention will become apparent to those skilled in the art from the following description wherein there is shown and described a preferred embodiment of the present invention, simply by way of illustration of one of the modes best suited to carry out the invention. Accordingly, the drawings and descriptions will be regarded as not as restrictive and only illustrative in nature.

BRIEF DESCRIPTION OF THE DRAWINGS

The accompanying drawings incorporated in, and forming a part of, the specification, illustrate several aspects of the present invention and together with the description serves to explain the principles of the invention. In the drawing.

Figure 1:
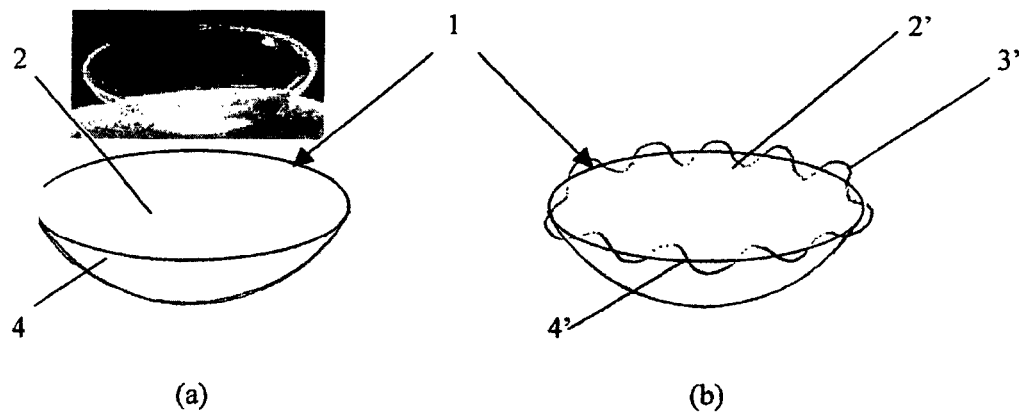
FIG. 1(a) is an isometric view of a contact lens without an embedded peripheral and circumferential band of a chemically active polymer such as polyacrylonitrile (PAN) artificial muscle fibers.
FIG. 1(b) is an isometric view of a contact lens with an embedded peripheral and circumferential band of a chemically active polymer such as polyacrylonitrile (PAN) artificial muscle fibers.

Reference will now be made in detail to the present preferred embodiment of the invention, an example of which is illustrated in the accompanying drawing.

DETAILED DESCRIPTION OF THE INVENTION

Generally, contacts are divided into two types, hard and soft. Hard contact lenses are generally manufactured from a rigid material known as Poly Methyl Methacrylate (PMMA). This material can be combined with other plastics to increase the oxygen permeability of the lens. Hard contacts lenses are generally between 8 mm and 10 mm in diameter with a center thickness of around 100 microns. Soft contact lenses are generally manufactured from the plastic hydrogen polymer Hydroxy Ethyl Methacrylate (HEMA). HEMA has a varying water content typically between 38% and 70%. Soft contact lenses typically range between 13 and 14.5 mm in diameter and generally have a center thickness of around 100 microns. Recently, according to the Contact Lens Institute of America (www.contactlensinstitute.net), the FDA has given limited permission to lens manufacturers to test a new type of soft contact lens made with silicone hydrogels. As will be described in greater detail below, according to one embodiment, a soft contact lens system integrated with a chemically active polymer is provided to allow wearers to control and change the power and focal point of their contact lenses.

The use of artificial muscles as implants in the human body are described in U.S. Pat. Nos. 6,168,575, 6,464,655, 6,511,508, 6,589,198, and 6,682,500, each of which is incorporated by reference in its entirety for all purposes.

Ionic polymeric artificial muscles and, in particular, contractile artificial muscles are described in the following references, each of which is incorporated by reference in its entirety for all purposes: U.S. Pat. Nos. 6,109,852 and 6,475,639; See also, M. Shahinpoor, K. J. Kim and Mehran Mojarrad, "Ionic Polymeric Conductor Composite Artificial Muscles," *ERI/AMRI Press*, Albuquerque, N. Mex., $2^{nd}$ Edition, (2005); M. Shahinpoor, "Ionic Polymer Conductor Composite Materials as Distributed Nanosensors, Nanoactuators and Artificial Muscles—A Review", Proceedings of the Second World Congress On Biomimetics and Artificial Muscle (Biomimetics and Nano-Bio 2004), Dec. 5-8, 2004, Albuquerque Convention Center, Albuquerque, N. Mex., USA, (2004); M. Shahinpoor, "Ionic Polymer Conductor Composites As Distributed Nanosensors, Nanoactuators and Artificial Muscles—A Review of Recent Findings", *Proceeding of The International Conference on Advanced Materials and Nanotechnology, AMN-1, The MacDiarmid Institute for Advanced Materials and Nanotechnology*, 9-11 Feb. 2003, Wellington, New Zealand, pp. 14-22, (2003); M. Shahinpoor, "Artificial Muscles", Chapter in *Encyclopedia of Biomaterials and Biomedical Engineering*, edited by G. Wnek and G. Bowlin, Marcel Dekker Publishers, New York, N.Y., (2004); M. Shahinpoor and A. Guran, "Ionic Polymer-Conductor Composites (IPCC) as Biomimetic Sensors, Actuators and Artificial Muscles, *SELECTED TOPICS IN STRUCTRONICS AND MECHATRONIC SYSTEMS*, Editors: A. Belyaev and A. Guran, pp. 417-436, World Scientific Publishers, London, (2003); M. Shahinpoor, "Ionic Polymer-Conductor Composites As Biomimetic Sensors, Robotic Actuators and Artificial Muscles—A Review", *Electrochimica Acta*, Vol. 48, No. 14-16, pp. 2343-2353, (2003); K. J. Kim and M. Shahinpoor, "Application of Polyelectrolytes in Ionic Polymeric Sensors, Actuators, and Artificial Muscles", Review Chapter in *Handbook of Polyelectrolytes and their Applications*, edited by S. K. Tripathy, J. Kumar and H. S. Nalwa, vol. 3; Applications of Polyelectrolytes and Theoretical Models, American Scientific Publishers, Stevenson Ranch, Calif., USA (2002); K. J. Kim and M. Shahinpoor, "A Novel Method of Manufacturing Three-Dimensional Ionic Polymer-Metal Composites (IPMC's) Biomimetic Sensors, Actuators and Artificial Muscle", *Polymer*, Vol. 43/3, pp. 797-802 (2002); M. Shahinpoor and K. J. Kim, "Novel Ionic Polymer-Metal Composites Equipped with Physically-Loaded Particulate Electrode As Biomimetic Sensors, Actuators and Artificial Muscles", *Actuators and Sensors A, Physical*, 96(2/3) A, 3163, pp. 125-132, (2002); M. Shahinpoor, Y. Bar-Cohen, J. Simpson and J. Smith," Ionic Polymer-Metal Composites (IPMC's) As Biomimetic Sensors, Actuators and Artificial Muscles—A Review", *Smart Materials & Structures Int. Journal*, vol. 7, pp. R15-R30, (1998); and M. Shahinpoor, M., "Active Polyelectrolyte Gels As Electrically-Controllable Artificial Muscles and Intelligent Network Structure", Book *Chapter in Structronic Systems, Part II*, edited by: H. S. Tzou, A. Guran, U. Gabbert, J. Tani and E. Breitbach, *World Scientific Publishers*, London, pp. 31-85, (1998).

The present disclosure provides a contact lens system integrated with a chemically active polymer to allow the wearer to alter the power and focal point of the contact lens in order to correct for different vision conditions. The chemically active polymer can, for example, be a sphinctering circumferential contractile endless band formed from polyacrylonitrile (PAN) ionic polymeric artificial muscle fiber bundles. The endless sphinctering PAN muscle can be in the form of a chemically activated hydrogel form of fibrous PAN that can be integrated with a soft contact lens.

PAN hydrogel is a multiblock copolymer that is formed from a combination of hard blocks (nitrile group) and soft blocks (hydrophilic groups), the proportion of which can be changed to modify the physical properties. PAN hydrogels have good biocompatibility and low toxicity. Compared with other hydrogels, PAN hydrogels have high tear strength. The FDA approved a hydrogel form of PAN in 2002 for a number of medical uses including cervical dilation during childbirth and gastro esophageal reflux disease (GERD).

Contractile fibrous gels of PAN artificial muscles are described in U.S. Pat. No. 5,389,222 as well as the references cited below, each of which is incorporated by reference in its entirety for all purposes: K. J. Kim, K. Choe, R. Samathan, J. Nam, M. Shahinpoor and J. Adams, "Toward Nanobiomimetic Muscles: Polyacrylonitrile Nanofibers", Proceeding of SPIE 11th Annual International Symposium on Smart Structures and Materials, 14-18 Mar., 2004, San Diego, Calif., SPIE Publication No. 5385-62, pp. 33-43, (2004); K. J. Kim, J. Caligiuri and M. Shahinpoor, "Contraction/Elongation Behaviour of Cation-Modified Polyacrylonitrile Fibers", Proceeding of SPIE 10th Annual International Symposium on Smart Structures and Materials, 2-6 Mar., 2003, San Diego, Calif., SPIE Publication No. 5051-23, pp. 207-213, (2003); K. J. Kim and M. Shahinpoor, "Electrical Activation of Contractile Polyacrylonitrile (PAN)—Conductor Composite Fiber Bundles As Artificial Muscles", Proceedings of the First World Congress On Biomimetics and Artificial Muscle (Biomimetics 2002), Dec. 9-11, 2002, Albuquerque Convention Center, Albuquerque, N. Mex., USA, (2002); M. Shahinpoor and M. Ahghar, "Modeling of Electrochemical Deformation in Poly-acrylonitrile (PAN) Artificial Muscles", Proceedings of the First World Congress On Biomimetics and Artificial Muscle (Biomimetics 2002), Dec. 9-11, 2002, Albuquerque Convention Center, Albuquerque, N. Mex., USA, (2002); K. J. Kim, J. Caligiuri, K. Choi, M. Shahinpoor, I. D. Norris, B. R. Mattes "Polyacrylonitrile Nanofibers as Artificial Nano-Muscles", Proceedings of the First World Congress On Biomimetics and Artificial Muscle (Biomimetics 2002), Dec. 9-11, 2002, Albuquerque Convention Center, Albuquerque, N. Mex., USA, (2002); M. Shahinpoor, K. J. Kim, L. O. Sillerud, I. D. Norris, B. R. Mattes, "Electroactive Polyacrylonitrile Nanofibers as Artificial Nanomuscles", Proceeding of SPIE 9th Annual International Symposium on Smart Structures and Materials, San Diego, Calif., SPIE Publication No. 4695-42, (March, 2002); M. Shahinpoor, K. J. Kim, and H. B. Schreyer, "Artificial Sarcomere and Muscle Made with Conductive Polyacrylonitrile (C-PAN) Fiber Bundles", Proceedings of SPIE 7th International Symposium on Smart Structures and Materials, Newport Beach, Calif., Vol. 3687, pp. 243-251 (March, 2000); H. B. Schreyer, N. Gebhart, K. J. Kim, and M. Shahinpoor, "Electric Activation of Artificial Muscles Containing Polyacrylonitrile Gel Fibers", Biomacromolecules, Vol. 1, No. 4, pp. 642-647, (2000); H. Brett Schreyer, Mohsen Shahinpoor, Kwang Kim, "Electrical activation of PAN Artificial Muscles", Proc. SPIE Smart Materials and Structures Conference, Mar. 1-5, 1999, New Port Beach, Calif., Publication No. SPIE 3669-19, pp. 192-198. (1999); M. Shahinpoor, "Active Polyelectrolyte Gels as Electrically-Controllable Artificial Muscles and Intelligent Network Structures", Book Chapter, in Active Structures, Devices and Systems, edited by H. S. Tzou, G. L. Anderson and M. C. Natori, World Science Publishing, Lexington, Ky., (1997); Salehpoor, K., Shahinpoor, M. and Mojarrad, M., "Some Experimental Results On The Dynamic Performance of PAN Muscles", Smart Materials Technologies, SPIE Publication No. Vol. 3040, pp. 169-173, (1997); K. Salehpoor, M: Shahinpoor and M. Mojarrad, "Electrically Controllable Artificial PAN Muscles", Proc. SPIE 1996 North American Conference on Smart Structures and Materials, Feb. 27-29, 1996, San Diego, Calif., vol. 2716, paper no. 07, (1996); See also, Y. Pierre Gobin, MD, Fernando Viñuela, MD, Harry V. Vinters, MD, Cheng Ji, MD and Kira Chow, MD, "Embolization with Radiopaque Microbeads of Polyacrylonitrile Hydrogel: Evaluation in Swine", Radiology, vol. 214, pp. 113-119, January (2000) and, Va Stoy, "New type of hydrogel for controlled drug delivery", J Biomater Appl., vol. 3, No. 4, pp. 552-604, April (1989)

According to one embodiment, contact lenses incorporating the chemically activated polymer can transform between multiple vision correction profiles. Transformation can be activated via a biasing means. According to this embodiment, the biasing means allows the contact lens wearer to selectively alter the conformation of his or her contact lens in order to correct different vision problems. As a non-limiting example, the conformation of the contact lens can be initially configured at a first diopter and, upon activation by the biasing means, the conformation of the contact lens can be altered to a second diopter. As another non-limiting example, the contact lens can initially adopt a conformation configured to correct for myopia and, upon activation by the biasing means, the conformation of the contact lens can be altered so as to correct for presbyopia. Alternatively, the contact lens can initially adopt a conformation configured to correct hyperopia and, upon activation by the biasing means, the conformation of the contact lens can be altered so as to correct for presbyopia. As still another non-limiting example, the contact lens can initially adopt a conformation configured to provide no vision correction and, upon activation by the biasing means, the conformation of the contact lens can be altered so as to correct for presbyopia. Of course, alternative conformations, configurations and combinations are possible and will be obvious to those of skill in the art and such configurations are considered to be part of the present disclosure.

The biasing means used to transform the contact lens from a first configuration to a second configuration can be, for example, a chemical solution. Moreover, the chemical solution can be provided in eye drop form.

Accordingly, the artificial muscle fibers that are integrated into the soft contact lens can be formed from a pH active material such as a pH active hydrogel form of fibrous PAN artificial muscles. Biocompatible contractile PAN artificial muscles generally have two distinct resilience coefficients or moduli of elasticity in contraction and in expansion, respectively, upon pH activation as reported in the following papers, each of which is incorporated by reference in its entirety for all purposes: M. Shahinpoor, K. J. Kim, and H. B. Schreyer, "Artificial Sarcomere and Muscle Made with Conductive Polyacrylonitrile (C-PAN) Fiber Bundles", *Proceedings of SPIE $7^{th}$ International Symposium on Smart Structures and Materials,* Newport Beach, Calif., Vol. 3687, pp. 243-251 (March, 2000); H. B. Schreyer, N. Gebhart, K. J. Kim, and M. Shahinpoor, "Electric Activation of Artificial Muscles Containing Polyacrylonitrile Gel Fibers", *Biomacromolecules*, Vol. 1, No. 4, pp. 642-647, (2000); and M. Shahinpoor, K. J. Kim and Mehran Mojarrad, "Ionic Polymeric Conductor Composite Artificial Muscles," *ERI/AMRI Press*, Albuquerque, N. Mex., $2^{nd}$. Edition, (2005).

Thus, pH active artificial muscles can be integrated into contact lens such that different vision correction configurations can be achieved when the contact lens is stimulated with solutions containing different pH levels. As such, an eye drop or pH activated and controllable synthetic muscle-based multi-powered soft contact lens system integrated with a sphinctering circumferential contractile endless band of a polyacrylonitrile (PAN) ionic polymeric artificial muscle fiber bundle can be employed. According to the present disclosure, the PAN sphinctering action due to eye drop pH-activated circumferential contraction can change the power and the focal point of the contact lens. A pH-modulated assortment of eye drop ophthalmic solutions can provide the actuation and enabling mechanisms. The ophthalmic solutions can be, for example, ophthalmic solutions having different pHs in the range of 4 to 8. According to one embodiment, adjusting any pH environment with another pH environment brings the pH to a normal ophthalmic pH of 7 and reverses the effect of the first pH environment. According to one embodiment, upon using an eye drop of pH=4, such as Ciloxan, the PAN muscles contract and increase the curvature and decrease the focal length of the contact lens and thus change its refractive power. An eye drop with a pH of 8 such as Timolol will, in turn, enable the PAN muscle fibers to expand under the resilience of the deformed contact lens to relax the contact lens and to allow it correct any refractive error on demand.

According to one embodiment, the PAN artificial muscle is placed in the peripheral circumference of a soft contact lens such that the changing PH environment in the eye induced by the introduction of a chemical solution causes the contractile muscle to act as a sphincter to change the curvature as well as the focal point of the contact lens and thus address refractive errors of the eye.

If desired, the PAN fibers can be equilibrated with a pH of 7 prior to being integrated into the contact lens. According to a first method of attaching the PAN fibers to a contact lens, the PAN fibers are wrapped around the cylindrical mantle of contact lens ingots and placed inside a slit cut helically into the mantle of the contact lens cylindrical ingot. Alternatively, the PAN fibers can be sewn into the edges of the contact lens in a serpentine fashion. Any loose ends can be tied together. The method of attachment can be selected and performed to provide the desired tension force. For example, the sphinctering bands can provide a resilient force in tension in the range of 0 to 10 grams. According to one embodiment, the sphinctering bands can be comprised of fibers of about 100 microns in overall diameter and microfiber strands of 10 microns in diameter.

Those of skill in the art will be familiar with a wide variety of contact lenses that will be suitable for use with the present disclosure. Suitable contact lens materials include gas permeable, non-gas permeable, and hydrophilic optical materials.

Turning now to the Figures,

FIGS. 1(*a,b*) are isometric views of a contact lens 1(*a*) without and (*b*) with an embedded peripheral and circumferential band of a chemically active polymer such as PAN artificial muscle fibers. As shown, the contractile fibers 3 of the PAN muscle are sewn into the peripheral circumference of a lens 2 and 2' in a serpentine manner.

Figure 2:
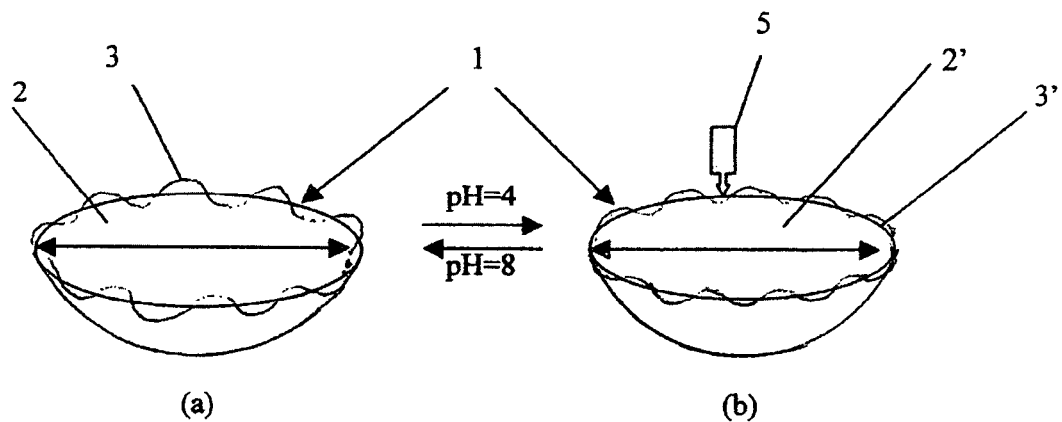
FIG. 2(a) is a schematic perspective view of a soft contact lens equipped with a peripheral and circumferential endless contractile band of polyacrylonitrile in a relaxed position with a relaxed or expanded PAN sphincter band.
FIG. 2(b) is a schematic perspective view of a soft contact lens equipped with a peripheral and circumferential endless contractile band of polyacrylonitrile in a deformed configuration in position with a contracted PAN sphincter band.

FIGS. 2(*a, b*) are schematic perspective views of a soft contact lens 1 equipped with a peripheral and circumferential endless contractile band of polyacrylonitrile fibers 3. In FIG. 2(*a*), 2 is in a relaxed position and PAN sphincter band 3 is in a relaxed or expanded position. In FIG. 2(*b*), lens 2' is in a deformed configuration and PAN sphincter band 3' is contracted. It can be seen that in this embodiment, upon contraction of the PAN fibers 3, the lens 2 is deformed into a smaller diameter D2 from a larger initial diameter D1 such that D1>D2. Moreover, the curvature, and thus the power, of the lens also changes. In the depicted embodiment, contraction of the PAN fibers 3' occurs in response to introduction of an eyedrop solution 5 having an acidic pH, for example a pH of around 4. Conversely, expansion of the PAN fibers 3 occurs in response to introduction of an eyedrop solution having an alkaline pH, for example a pH of around 8 which causes the PAN fibers 3 to relax such that the resilience of the deformed contact lens 2' returns the PAN fibers to their relaxed position and the diameter of the lens returns to its original, relaxed configuration.

Figure 3:
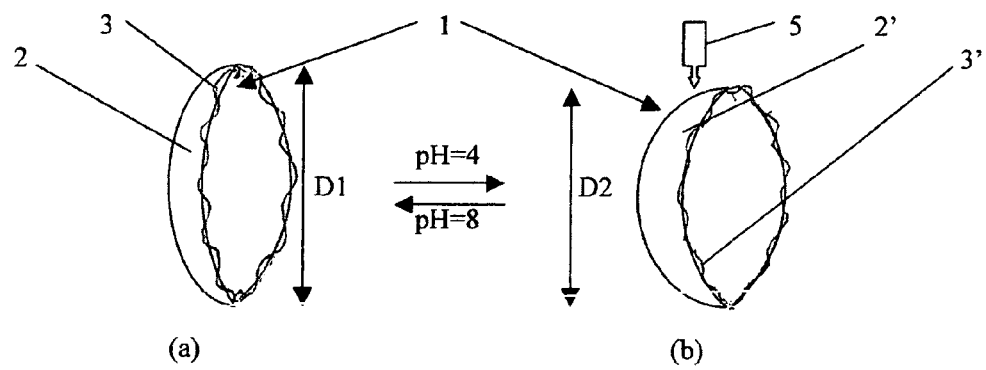
FIG. 3(a) is a schematic isometric side view of a soft contact lens equipped with a peripheral and circumferential endless contractile band of polyacrylonitrile in a relaxed position with a relaxed or expanded PAN sphincter band.
FIG. 3(b) is a schematic isometric side view of a soft contact lens equipped with a peripheral and circumferential endless contractile band of polyacrylonitrile in a deformed configuration with a contracted PAN sphincter band.

FIGS. 3(a, b) are schematic isometric side views of a soft contact lens 1 equipped with a peripheral and circumferential endless contractile band of polyacrylonitrile fibers 3 in a relaxed lens conformation (a) and a deformed lens conformation (b). In FIG. 3(a), lens 2 is in a relaxed conformation due to a relaxed, or expanded, PAN sphincter band 3. In FIG. 3(b), lens 2' is in a deformed conformation due to a contracted PAN sphincter band 3'. Again; contraction of the PAN fibers 3 occurs in response to an acidic pH eye drop solution and expansion of the PAN fibers 3' occurs in response to an alkaline eye drop solution which causes the PAN fibers 3' to relax such that the resilience of the deformed contact lens 2' returns the soft relaxed PAN fibers 3' from the contracted diameter D2 to their original configuration and relaxed diameter D1.

Figure 4:
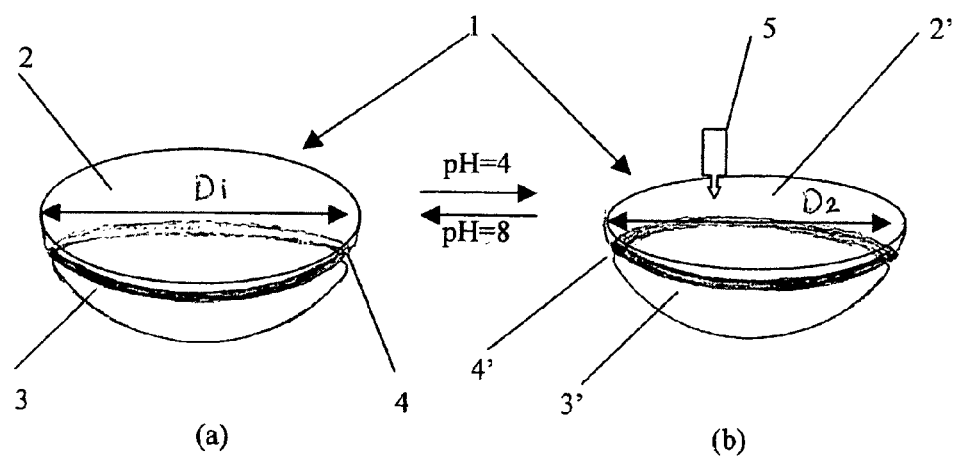
FIG. 4(a) is a schematic isometic view of a soft contact lens with a side groove for the placement of the contractile band of PAN muscles equipped with a peripheral and circumferential endless contractile band of polyacrylonitrile in a relaxed position with a relaxed or expanded PAN sphincter band.
FIG. 4(b) is a schematic isometic view of a soft contact lens with a side groove for the placement of the contractile band of PAN muscles equipped with a peripheral and circumferential endless contractile band of polyacrylonitrile in a deformed configuration with a contracted PAN sphincter band.

FIGS. 4(a, b) are schematic perspective views of a soft contact lens 2, 2' with a circumferential groove 4, 4' for the placement of the contractile band of PAN muscles 3 and 3', respectively. As shown, lens 2 includes a groove 4 that is equipped with a peripheral and circumferential endless contractile band of polyacrylonitrile fibers 3. Upon contraction of the PAN fibers 3 the lens 2 is deformed into a lens 2' of smaller diameter D2 from a larger initial diameter D1 such that D1>D2 and the curvature and thus the power of the lens changes as shown in FIG. 4(b).

Figure 5:
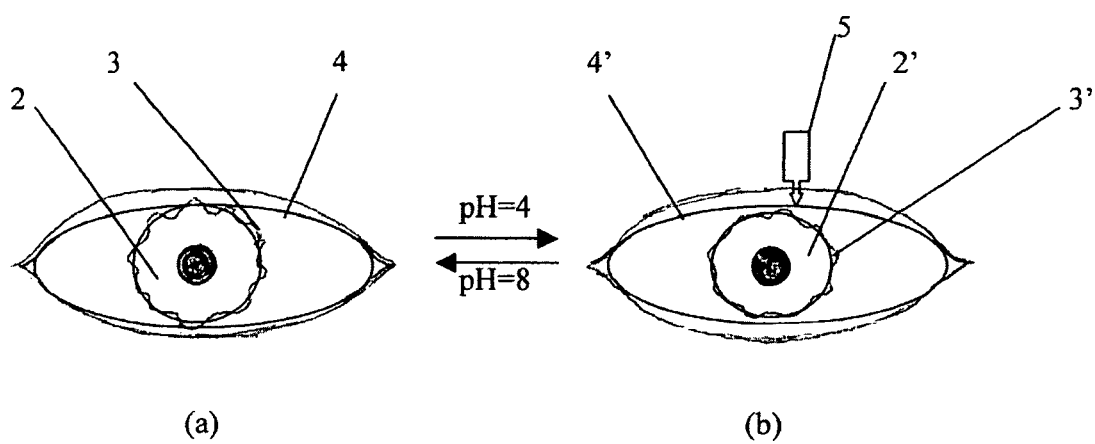
FIG. 5(a) is a schematic view of an eye drop activated contact lens in the eye of a user showing it in a relaxed position after exposure to a solution containing a pH of 7.
FIG. 5(b) is a schematic view of an eye drop activated contact lens in the eye of a user showing it in an activated position after exposure to a solution containing a pH of less than 7.

FIGS. 5(a, b) are schematic views of the eye drop activated contact lens 1 in the eye 4 of a user. FIG. 5(a) shows contact lens 1 in a relaxed position after exposure to a solution with a pH of 7. FIG. 5(b) shows contact lens 1 in an activated position after exposure to a solution having a pH of less than 7.

The foregoing description of a preferred embodiment of the invention has been presented for purposes of illustration and description. It is not intended to be exhaustive or to limit the invention to the precise form disclosed. Obvious modifications or variations are possible in light of the above teachings.

The embodiment was chosen and described to provide an illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

Unless specifically stated to the contrary, all references cited in the present disclosure are incorporated by reference in their entirety for all purposes.

What is claimed is:

1. A contact lens comprising:
   a soft lens surface having a first conformation;
   (a) a band consisting of ionic polyacrylonitrile polymeric artificial muscle fibers situated at the peripheral circumference of the contact lens or (b) a band consisting of polyacrylonitrile ionic polymeric artificial muscle fibers sewed into the edges of the contact lens in serpentine fashion;
   such that pH activation of the polyacrylonitrile band alters the conformation of the soft lens surface.

2. The contact lens of claim 1 where the polyacrylonitrile band is configured to contract upon exposure to an acidic environment.

3. The contact lens of claim 1 where the polyacrylonitrile band is configured to relax upon exposure to a basic environment.

4. The contact lens of claim 1 wherein in the first conformation the contact lens provides a first power and focal point and upon pH activation of the polyacrylonitrile band the contact lens provides a second power and focal point.

5. The contact lens of claim 1 where the polyacrylonitrile band is wrapped around a cylindrical mantle of contact lens ingots and placed inside a slit cut helically into the mantle of the cylindrical ingot.

6. A method of correcting vision comprising:
   providing a contact lens as in claim 1; and
   exposing the contact lens to a first chemical solution having a first pH to cause the polyacrylonitrile band to undergo a first conformational change, thereby altering the base curvature of the lens.

7. The method of claim 6 further comprising: exposing the contact lens to a second chemical solution having a second pH, different from the first pH, to cause a reversal of the conformation change of the polyacrylonitrile band caused by the first chemical solution, thereby returning the base curvature of the lens to the native base curvature.

8. The method of claim 7 where the first chemical solution is an acidic solution.

9. The method of claim 8, where the second chemical solution is a basic solution.

10. A kit for correcting vision comprising:
    a contact lens as in claim 1;
    a first solution having a first pH configured to cause the polyacrylonitrile band integrated with the lens to contract and thereby adopt a first conformation; and
    a second solution having a second pH, different than the first pH, configured to cause the polyacrylonitrile band integrated with the lens to relax and thereby adopt a second conformation.

11. The kit of claim 10 where the first and second solutions are provided in the form of eye drops.

12. The kit of claim 10 where the first solution is acidic and the second solution is basic.

* * * * *